Nov. 29, 1938. R. B. SUTTER 2,138,217

ELECTRICAL HEATING SYSTEM

Filed Dec. 24, 1935

ROSER B. SUTTER
INVENTOR.

BY Chester Mueller
ATTORNEY.

Patented Nov. 29, 1938

2,138,217

UNITED STATES PATENT OFFICE 2,138,217

ELECTRICAL HEATING SYSTEM

Roser B. Sutter, Newark, N. J.

Application December 24, 1935, Serial No. 56,094

6 Claims. (Cl. 219—19)

My invention relates to a floor or wall covering having incorporated therein an electrical heating unit.

The object of my invention is to heat rooms, passenger vehicles or other enclosures by means of concealed electric heating units incorporated in the floors or walls thereof.

Another object is to provide for safe permanent installations of electrical heating units.

Other objects will be apparent from the description which follows:

It is well known that heating systems and methods now in use do not efficiently employ the principles of heat transfer in delivering heat at the areas of use for human comfort. Relatively small surfaces of extreme heat are relied upon to heat by radiation and convection, large volumes of air. When reliance is placed principally upon circulation of heated air throughout a room, it results in warming the room from the top downward. Under some weather conditions the floor and the space immediately above, are never adequately heated. My invention results in a heated floor which distributes heat to the occupants by each of the three methods heat is transferred—radiation, conduction and convection. By direct contact with the heated floor the feet are warmed and it is a known fact that warm feet give the entire body a sense of warmth. Furthermore the radiation of heat and the rising currents of warm air, cause a continuous flow of heat past the occupants of the room, giving them the immediate benefit of the heat as it is delivered into the room.

I prefer to heat all of the floor, or as much as thermal conditions make necessary, to a temperature ranging either several degrees above or below normal human body temperature. This means the floor will not be too hot to touch yet it will warm the feet and there will be a steady inflow of heat into the room from the bottom up. Moreover, this method of heating avoids use of valuable space in the room and enables heating of portions inaccessible to present heating units. It makes possible a uniform distribution of heat, and the use of electricity as a source of heat dispenses with the cumbersome, expensive heating plants that use basement space as well as valuable space in the rooms heated.

Passenger vehicles using my invention will be adequately heated at no discomfort to passengers adjacent to the heating units such as present methods cause.

I am aware that heretofore provision has been made for inserting or incorporating electrical heating elements in floor or wall construction. However this has previously been done for floorings by having the electrical conductor itself isolated from the floor material by being placed in a duct or tube lying therein. In cases where the conductor has been in intimate association with the material composing the panel, such material has not been suited to floor wearing surfaces nor has it been strong enough to provide weight bearing capacity. By use of materials that I give examples of hereinafter I am able to cement bare resistance wires within the floor or wall material. My invention is illustrated in the accompanying drawing in which:—

Referring to the numbered parts in each of the three views, each part carrying the same identifying number wherever shown, the embodiment of my invention as illustrated may be described as follows:—

Figure 1:
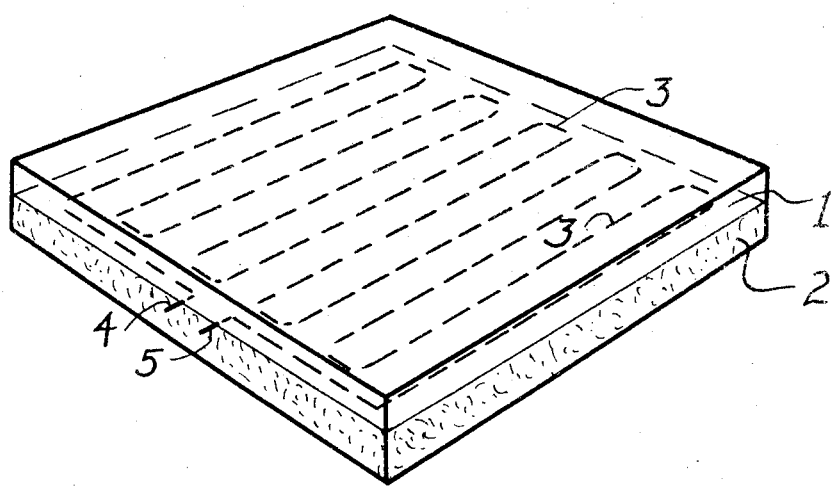
Figure 1 is an isometric view of a floor surfacing and heating unit.
Figure 2:
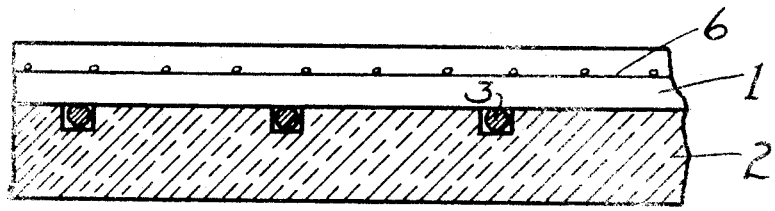
Figure 2 is a cross sectional view of such a unit as shown in Figure 1.

In Fig. 1, the isometric view, top layer 1, of a heating unit, presents the conventional appearance of a floor surface. In dotted outline is indicated the heating element 3 which lies beneath the top layer 1, and as shown in Fig. 2, it lies in recesses formed in layer 2 immediately beneath. Figure 1 shows lead wires 4 and 5, of heating element 3, to which a source of current may be attached by any of the conventional electrical connections.

Figure 2 is a cross sectional view and shows a top layer 1 having incorporated therein a wire mesh layer 6.

Figure 3:
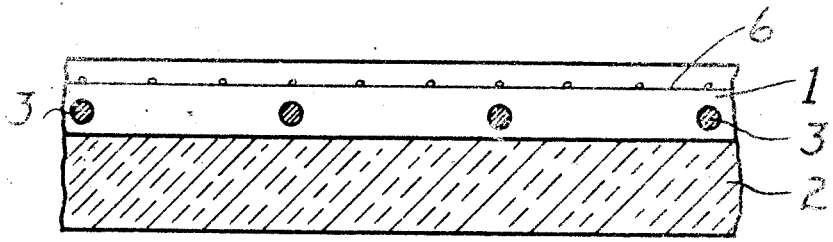
Figure 3 is a cross sectional view showing a modification in kind and appearance of the internal elements of the unit shown in Figure 1.

In Figure 3, the heating element 3 is not placed in grooves or recesses in layer 2 but is shown incorporated in the lower part of top layer 1.

The surface layer 1 is composed of heat conducting material that will neither warp or crack under conditions of alternate heat and cold and while under the usual floor loading impacts and strains. Subsurface layer 2 is composed of a heat insulating and heat reflecting material. The composition and thicknesses of these layers is more particularly described hereinafter.

It is deemed desirable to generate heat over the greatest possible area although depending on climatic and other conditions either a part or all of a floor may have heating elements embedded therein. As a practical means of installation as many units, similar to the one I have shown, may be used in a floor as is required for heating. The balance of the flooring may be laid with similar material devoid of heating elements. Baseboards may be constructed of these units if additional heating surface is needed. Suitable switches and/or thermostats may be connected to the units to permit heat control.

As stated, any sublayer, a non-conductor of electricity and a poor conductor of heat, may be used. For example, I have successfully used for such a layer an oxichloride cement bound composition composed of the following:—

| | | |
|---|---|---|
| Granulated cork | kilos | 10 |
| Magnesite | do | 13 |
| Magnesium chloride (18° Baumé) | liters | 10 |

The above was mixed and slightly compressed into a homogeneous mass without destroying the included air cells. Suitable recesses can be formed in the surface during the operation to receive the heating element if the cross section of Figure 2 is sought.

Not only did this composition serve to insulate the floor from heat losses but it also acted as a soundproofer and fire resistant. In addition it improved the resiliency of the floor, acting as a cushion to impact on the surface layer.

For the top layer the material must be a good conductor of heat and capable of withstanding the shock and wear to which a floor is subjected. It should make a wearing surface easy to keep clean and should lend itself to all kinds of color designs and variegated shades. As an example I have used the following oxichloride cement bound composition that meets these requirements:

| | Kilos |
|---|---|
| Silica | 90 |
| Metal filings | 10 |
| Asbestos | 5 |
| Magnesite | 40 |

Sufficient chloride of magnesium (22° Baumé) to bind the magnesite was used.

Many variations of the above and many other mixtures can be used. Instead of metal filings steel or metal shavings may be used, or they may be omitted entirely. In using metal filings, or shavings, or steel wool I sometimes spray them with an alkaline proof enamel which also serves to render them non-conductors of electricity and rust proof. Use of variously colored sprayed metallic ingredients gives the wearing surface of the top layer variegated effects. As an added protection to the electrical heating element it may be sprayed with an alkaline proof lacquer or enclosed in a protective electrical non-conducting case. Embedding a metal mesh or perforated sheet in the top layer will add strength and improve heat conductivity.

Colors or abrasive resisting materials may be incorporated in this layer to develop a product identical in appearance to similar floor surfaces.

Thicknesses of the layers depend on several conditions. I find generally that sublayers with high heat insulating properties should be a minimum of 1" thick while the top layer should be at least 1/8" thick.

It is evident that instead of being applied to floors in units, the entire floor may be laid in integral construction, the heating elements being incorporated as the floor is laid. For practical construction purposes and for ease of possible replacement of defective units it is believed the premolded units will be best.

The expression "oxichloride cement" used in the description and claims is intended to mean the cement also known in the art as magnesia, zinc, or sorel cement. Sorel cements are well known and are the same compositions I refer to as "oxichloride cements."

All of the foregoing is intended to be illustrative only, and in nowise limiting the scope of my invention.

What I claim is:

1. A heat radiating structural floor slab or wall panel comprising in unified construction a sublayer which includes granulated cork and an oxichloride cement, a wearing surface layer which includes silica, metal filings or shavings, and an oxichloride cement, and an electrical resistor embedded therein in a plane substantially parallel to the wearing surface.

2. A heat radiating structural floor slab or wall panel comprising in unified construction a sublayer which includes granulated cork and an oxichloride cement, a wearing surface layer which includes silica, steel wool and an oxichloride cement, and an electrical resistor embedded therein in a plane substantially parallel to the wearing surface.

3. A heat radiating structural floor slab or wall panel comprising a sublayer which includes granulated cork and an oxichloride cement, a wearing surface including silica, alkaline proof enamel coated metallic ingredients and an oxichloride cement, and an electrical conductor embedded between the two layers.

4. A heat radiating structural floor slab or wall panel comprising a heat insulating sublayer which includes granulated cork and an oxichloride cement, a wearing surface heat conducting layer which includes silica and an oxichloride cement, and an electrical conductor coated with alkaline proof lacquer embedded between the two layers.

5. A heat radiating structural floor slab or wall panel comprising a sublayer which includes granulated cork and an oxichloride cement, a wearing surface including silica, alkaline proof enamel coated metallic ingredients and an oxichloride cement, and an electrical resistor embedded therein.

6. A heat radiating structural floor slab or wall panel comprising alkaline proof enamel coated metallic aggregates bound with oxichloride cement and an electrical resistor embedded therein.

ROSER B. SUTTER.